US010536650B2

(12) United States Patent
Woolfenden et al.

(10) Patent No.: US 10,536,650 B2
(45) Date of Patent: *Jan. 14, 2020

(54) COMPACT CAMERA

(71) Applicant: Fluke Corporation, Everett, WA (US)

(72) Inventors: Patrick R. Woolfenden, Plymouth, MN (US); Brian R. Gattman, Minneapolis, MN (US); William Weidner, Dublin, NH (US)

(73) Assignee: Fluke Corporation, Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/128,955

(22) Filed: Sep. 12, 2018

(65) Prior Publication Data
US 2019/0045145 A1 Feb. 7, 2019

Related U.S. Application Data

(63) Continuation of application No. 15/057,807, filed on Mar. 1, 2016, now Pat. No. 10,079,983.

(51) Int. Cl.
H04N 5/33 (2006.01)
G02B 7/04 (2006.01)
G02B 13/14 (2006.01)
H04N 5/225 (2006.01)
G02B 7/02 (2006.01)

(52) U.S. Cl.
CPC ............ *H04N 5/332* (2013.01); *G02B 7/026* (2013.01); *G02B 7/04* (2013.01); *G02B 13/14* (2013.01); *H04N 5/2252* (2013.01); *H04N 5/2254* (2013.01); *H04N 5/2257* (2013.01); *H04N 5/2258* (2013.01)

(58) Field of Classification Search
CPC .... H04N 5/332; H04N 5/2252; H04N 5/2254; H04N 5/2257; H04N 5/2258; G02B 7/026; G02B 7/04; G02B 13/14
See application file for complete search history.

(56) References Cited

U.S. PATENT DOCUMENTS

| | | | | |
|---|---|---|---|---|
| 2003/0095800 | A1* | 5/2003 | Finizio | G03B 17/00 396/427 |
| 2004/0042089 | A1* | 3/2004 | Nomura | G02B 7/08 359/819 |
| 2006/0261271 | A1* | 11/2006 | Lee | G01J 5/04 250/330 |

(Continued)

Primary Examiner — David P Porta
Assistant Examiner — Jeremy S Valentiner
(74) Attorney, Agent, or Firm — Fredrikson & Byron P.A.

(57) ABSTRACT

Infrared cameras can include an infrared sensor and an infrared lens assembly defining an optical axis. A camera can include an inner gear engaging the infrared lens assembly and a focus ring that engages the inner gear. The inner gear can engage the focus ring and the infrared lens assembly such that rotation of the focus ring about its central axis can cause the rotation of the infrared lens assembly about its optical axis, which may be offset from the central axis of the focus ring. The camera can include a sensor can threadably engaging the infrared lens assembly and fixed relative to the infrared sensor such that rotation of the infrared lens assembly causes the infrared lens assembly to move relative to the infrared sensor. The sensor can support other components such as a visible light lens assembly or a laser within a perimeter of the focus ring.

20 Claims, 9 Drawing Sheets

(56) References Cited

U.S. PATENT DOCUMENTS

| | | | |
|---|---|---|---|
| 2007/0235634 A1 | 10/2007 | Ottney et al. | |
| 2007/0297785 A1* | 12/2007 | Kogure | G03B 3/02 396/90 |
| 2013/0083199 A1* | 4/2013 | Choi | H04N 5/332 348/164 |
| 2014/0160299 A1 | 6/2014 | Mumaw | |
| 2014/0267757 A1* | 9/2014 | Abramson | H04N 5/23216 348/164 |
| 2015/0316473 A1* | 11/2015 | Kester | G06K 9/22 250/339.02 |
| 2016/0065938 A1* | 3/2016 | Kazemzadeh | H04N 13/232 348/46 |
| 2016/0124198 A1* | 5/2016 | Chern | G02B 15/04 359/672 |
| 2017/0061663 A1 | 3/2017 | Johnson et al. | |

* cited by examiner

COMPACT CAMERA

CROSS REFERENCE TO RELATED APPLICATION

This application is a continuation application of U.S. patent application Ser. No. 15/057,807, filed Mar. 1, 2016 and titled "DESIGN FOR COMPACT CAMERA," the entire content of which is incorporated herein by reference.

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Traditional manual focus cameras use a focus ring concentric with the infrared imaging axis of the camera. Typically, users prefer a large diameter focus ring to allow ease of focus, and so that the user can see the edges of the focus ring around the edges of the camera when viewing the back of the camera. The combination of a concentric and large focus ring enlarges the physical size of the camera. However, a large camera increases weight and can make the camera more difficult to use. Additionally, an infrared imaging axis concentric with the focus ring leaves little room for additional components to be positioned proximate the infrared imaging axis. Accordingly, additional components such as visible light cameras, laser pointers, torches, and the like are typically positioned a considerable distance from the infrared imaging axis, contributing to parallax errors.

SUMMARY

Aspects of the present disclosure are directed toward cameras and assembly methods therefor. Cameras can include an infrared sensor configured to receive infrared radiation from a target scene and generate infrared image data of the target scene. A camera can further include an infrared lens assembly comprising at least one lens defining an optical axis. The infrared lens assembly can be configured to focus infrared radiation onto the infrared sensor. A focus ring can be used to adjust the position of the infrared lens assembly relative to the infrared sensor, thereby adjusting the focus of the camera.

In some examples, the focus ring substantially surrounds the infrared lens assembly. The focus ring can be configured such that rotation of the focus ring about its central axis can cause the infrared lens assembly to move relative to the infrared sensor. For example, in some embodiments, the camera includes an inner gear that includes an outer surface that engages an inner surface of the focus ring and an inner surface that engages and substantially surrounds a portion of the infrared lens assembly. The inner gear can be configured such that the relative engagement between the focus ring, the inner gear, and the lens assembly causes the infrared lens assembly to rotate about its optical axis when the focus ring is rotated about its central axis. In some embodiments, the central axis of the focus ring is offset from the optical axis of the at least one lens in the infrared lens assembly.

According to some embodiments, a camera can include a sensor can configured to support the infrared lens assembly. For example, the infrared lens assembly may be threadably engaged with the sensor can. In some such examples, a spring or other element can apply pressure between the infrared lens assembly and the sensor can to rigidly hold the infrared lens assembly steady relative to the sensor can. Because of the threaded engagement, rotating the focus ring relative to the sensor can cause the infrared lens assembly to similarly rotate within the sensor can and translate relative thereto because of the threaded engagement. The sensor can may be fixed relative to the infrared sensor so that translation of the infrared lens assembly relative to the sensor can similarly causes translation of the infrared lens assembly relative to the infrared sensor.

Exemplary cameras can further include a visible light sensor configured to receive visible light radiation from a target scene and generate visible light image data representative of the target scene and a visible light lens assembly configured to focus visible light radiation onto a visible light sensor. In some examples, the visible light lens assembly is supported by the sensor can. The camera can additionally or alternatively include a laser, which can be supported by the sensor can. In some embodiments, the visible light lens assembly and/or the laser can be supported by the sensor can and positioned within the perimeter of the focus ring.

In some embodiments, a camera can include a sensor configured to determine the focal position of the infrared lens assembly relative to the infrared sensor. In some such embodiments, the camera can include a detector fixed relative to the infrared sensor and a plunger adapted to move as the infrared lens assembly moves. The sensor can be capable of sensing the relative distance to the plunger and relative movement of the plunger toward and away from the detector.

Assembly methods for some such cameras can include threadably engaging the infrared lens assembly onto the sensor can and inserting the infrared lens assembly into a housing from a back side of the housing. An inner gear can be attached to the infrared lens assembly via a front side of the housing and a focus ring can be positioned on the front side of the housing such that an inner surface of the focus ring engages an outer surface of the inner gear. In some examples, when assembled as such, rotation of the focus ring can likewise cause rotation of the inner gear and the infrared lens assembly relative to the sensor can, causing the infrared lens assembly to translate relative to the sensor can.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene, including an object or objects, under observation. The thermal imaging camera may detect infrared radiation given off by the scene and convert the infrared radiation into an infrared image indicative of the heat patterns. In some embodiments, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Various embodiments provide methods and systems for producing thermal images with reduced noise using averaging techniques. To further improve image quality and eliminate problems that may arise from averaging (e.g. blurring, ghosting, etc.), an image alignment process is performed on the thermal images prior to averaging.

Figure 1:
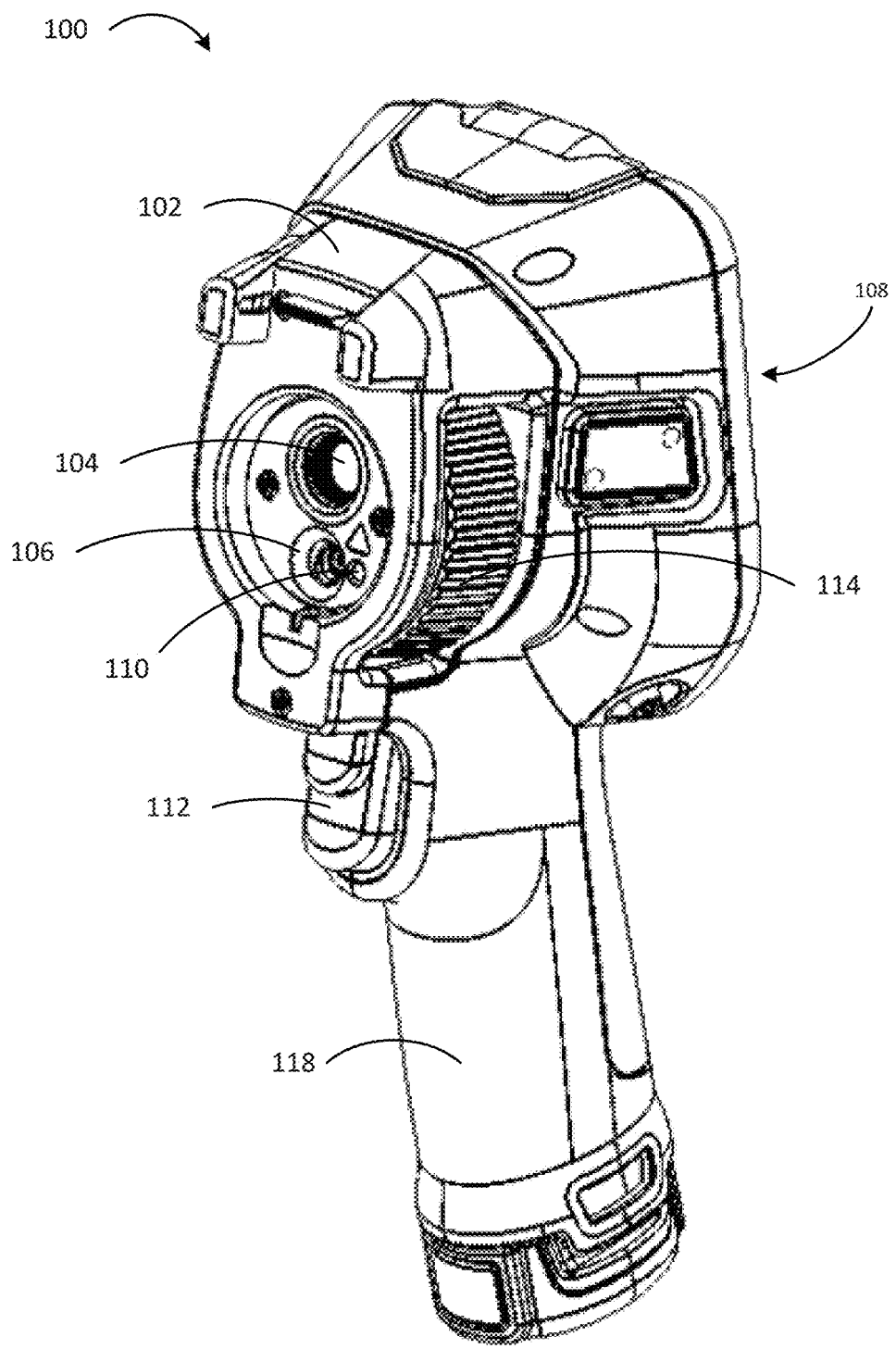
FIG. 1 is a perspective front view of an example thermal imaging camera.
Figure 2:
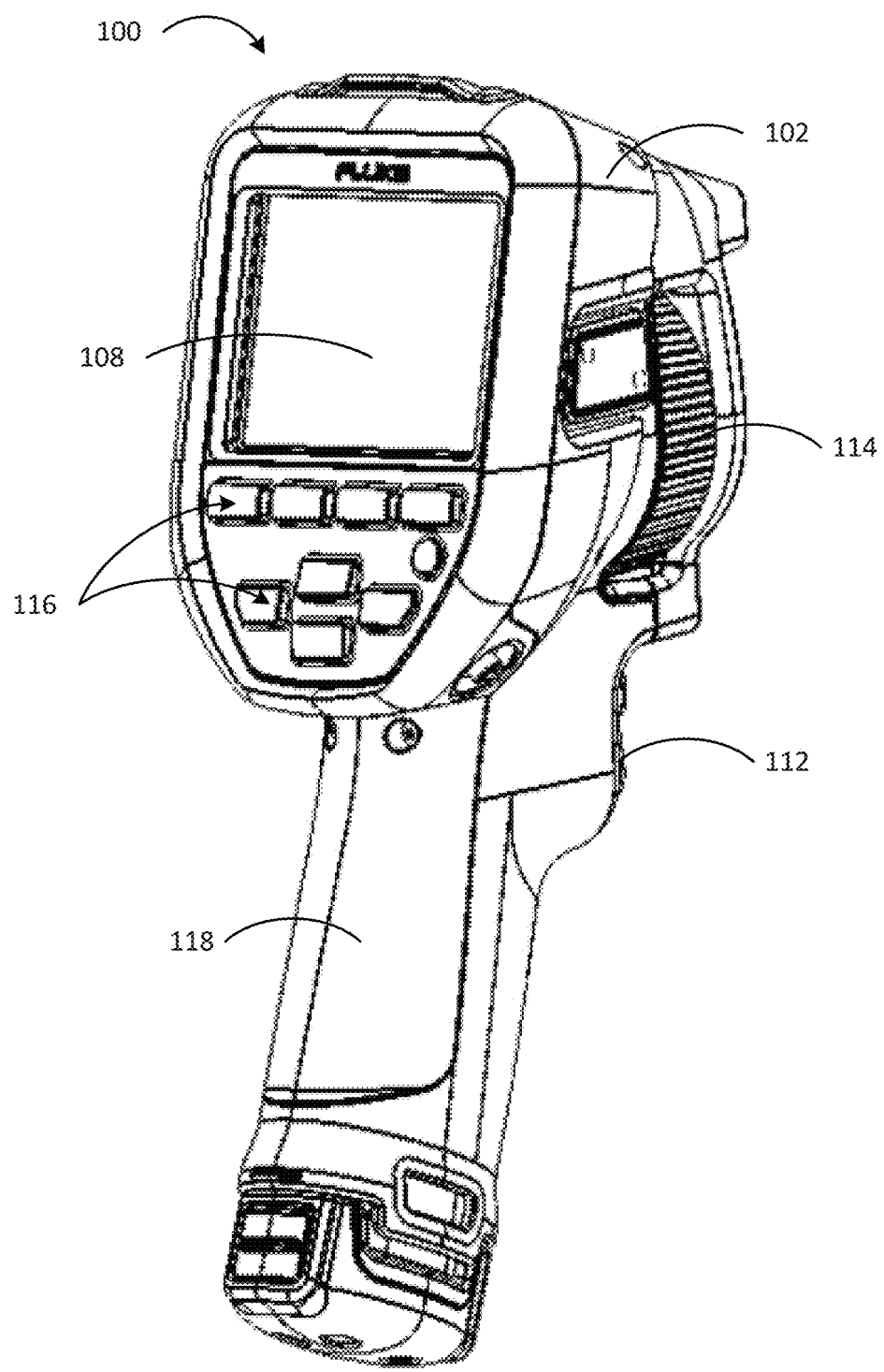
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle 118 for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera. Additionally or alternatively, the focus mechanism may move the FPA relative to one or more lenses of the infrared lens assembly.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series. In some examples, the infrared lens assembly 104 may include lenses having diffractive or reflective properties or elements. Additional optical components such as mirrors (e.g., Fresnel mirrors) and the like may be included within or otherwise proximate to the infrared lens assembly 104.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move one or both of the FPA and the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114, or may, in other embodiments, simply maintain a fixed focus.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a combined image that includes a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
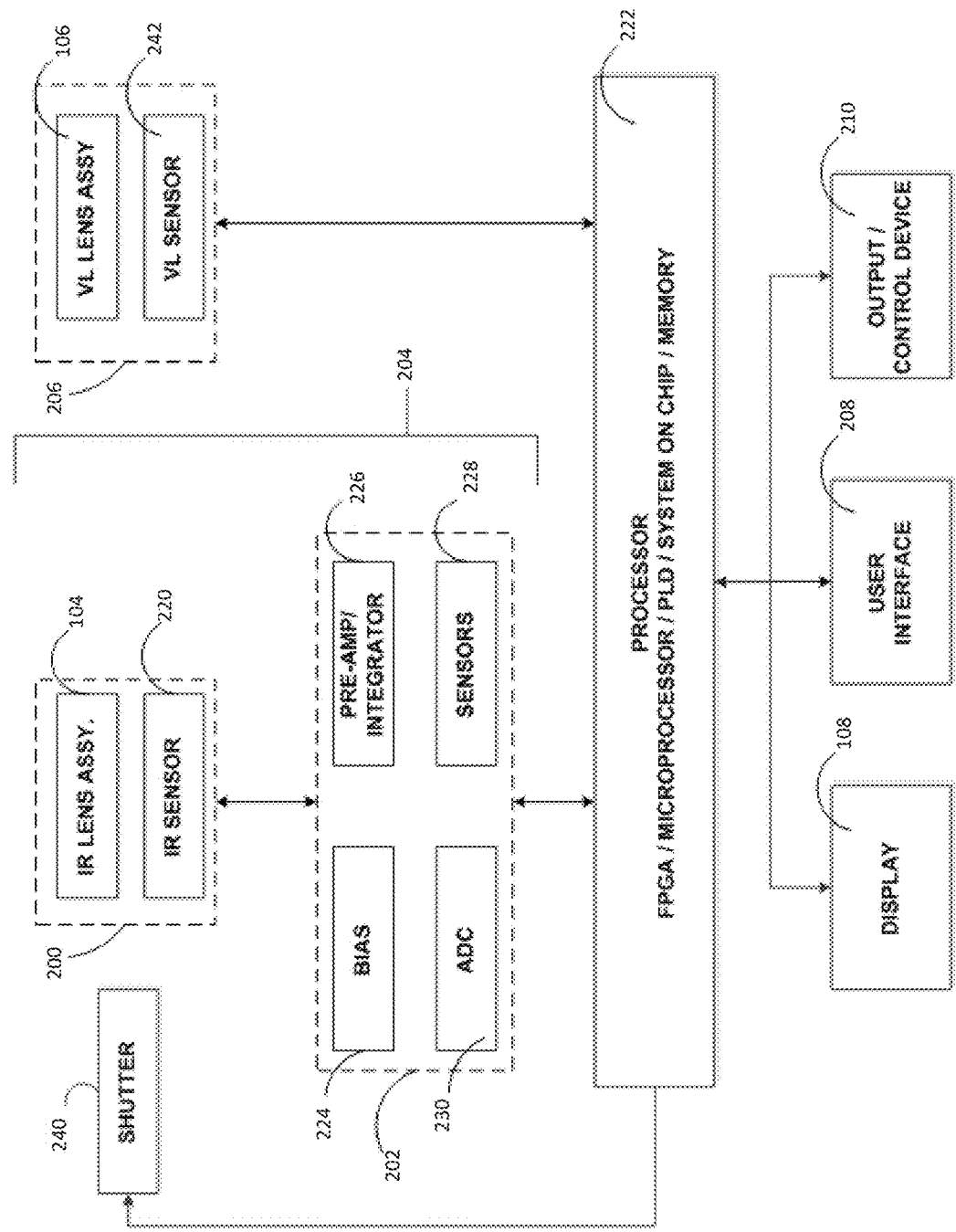
FIG. 3 is a functional block diagram illustrating example components of the thermal imaging camera of FIGS. 1 and 2.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

For instance, in examples in which infrared sensor 220 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a sensor pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 222 may measure the change in resistance of each bolometer by applying a current (or voltage) to each bolometer and measure the resulting voltage (or current) across the bolometer. Based on these data, processor 222 can determine the amount of infrared energy emitted by different portions of a target scene and control display 108 to display a thermal image of the target scene.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160, or 650×480. In other examples, infrared sensor 220 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the sensor pixels. Such ROIC is commonly fabricated as an integrated circuit on a silicon substrate. The plurality of detector elements may be fabricated on top of the ROIC, wherein their combination provides for the IR sensor 220. In some embodiments, the ROIC can include components discussed elsewhere in this disclosure (e.g. an analog-to-digital converter (ADC)) incorporated directly onto the FPA circuitry. Such integration of the ROIC, or other further levels of integration not explicitly discussed, should be considered within the scope of this disclosure.

As described above, the IR sensor 220 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 220. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 220, with such frames being produced at a rate sufficient to generate a video representation (e.g. 30 Hz, or 60 Hz) of the thermal image data.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226. Typically, the pre-amp/integrator 226 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 222 of the thermal imaging camera 100.

In some embodiments, the front end circuitry 202 can include one or more additional elements for example, additional sensors 228 or an ADC 230. Additional sensors 228 can include, for example, temperature sensors, visual light sensors (such as a CCD), pressure sensors, magnetic sensors, etc. Such sensors can provide additional calibration and detection information to enhance the functionality of the thermal imaging camera 100. For example, temperature sensors can provide an ambient temperature reading near the IR sensor 220 to assist in radiometry calculations. A magnetic sensor, such as a Hall Effect sensor, can be used in combination with a magnet mounted on the lens to provide lens focus position information. Such information can be useful for calculating distances, or determining a parallax offset for use with visual light scene data gathered from a visual light sensor.

An ADC 230 can provide the same function and operate in substantially the same manner as discussed below, however its inclusion in the front end circuitry 202 may provide certain benefits, for example, digitization of scene and other sensor information prior to transmittal to the processor 222 via the connection therebetween. In some embodiments, the ADC 230 can be integrated into the ROIC, as discussed above, thereby eliminating the need for a separately mounted and installed ADC 230.

In some embodiments, front end components can further include a shutter 240. A shutter 240 can be externally or internally located relative to the lens and operate to open or close the view provided by the IR lens assembly 104. As is known in the art, the shutter 240 can be mechanically positionable, or can be actuated by an electro-mechanical device such as a DC motor or solenoid. Embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before thermal imaging camera 100 is used in another application. Processor 222 may also be implemented as a System on Chip that integrates some or all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data. By generating a frame of infrared image data, processor 222 captures an infrared image of a target scene at substantially a given point in time. That is, in some examples, a plurality of pixels making up the infrared image may be captured simultaneously. In other embodiments, sets of one or more pixels may be captured serially until each pixel has been captured.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

With each sensor element of infrared sensor 220 functioning as a sensor pixel, processor 222 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. When displayed on a display 108, an infrared image can comprise a plurality of display pixels. Display pixels can have any defined relationship with corresponding sensor pixels. In some examples, each sensor pixel corresponds to a display pixel in an image representation of infrared data. In other examples, a plurality of sensor pixels may be combined (e.g., averaged) to provide infrared information for a single display pixel. In still other examples, a single sensor pixel may contribute to a plurality of display pixels. For example, a value from a single sensor pixel may be replicated at nearby pixels, such as in a simple upsampling procedure. In other examples, neighboring or otherwise nearby pixels may be averaged to create a new pixel value, such as in an interpolation procedure. Because relationships between display pixels and sensor pixels are defined with respect to camera operation, the generic term "pixel" may refer to the sensor pixel, the display pixel, or the data as it is processed from the sensor pixel to the display pixel unless otherwise stated. Processor 222 may perform computations to convert raw infrared image data into scene temperatures (radiometry) including, in some examples, colors corresponding to the scene temperatures.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by thermal imaging camera 100) or less than an entire infrared image (e.g., a lesser port of the entire target scene captured by thermal imaging camera 100). Processor 222 may perform other image processing functions, as described in greater detail below.

Independent of the specific circuitry, thermal imaging camera 100 may be configured to manipulate data representative of a target scene so as to provide an output that can be displayed, stored, transmitted, or otherwise utilized by a user.

Thermal imaging camera 100 includes visible light camera module 206. Visible light camera modules are generally well known. For examples, various visible light camera modules are included in smartphones and numerous other devices. In some embodiments, visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 3, visible light camera module 206 is illustrated as including visible light lens assembly 106 and visible light sensor 242. As described above with respect to FIGS. 1 and 2, visible light lens assembly 106 includes at least one lens that takes visible light energy emitted by a target scene and focuses the visible light energy on visible light sensor 242. Visible light sensor 242 responds to the focused energy by generating an electrical signal that can be converted and displayed as a visible light image on display 108. In some examples, the visible light module 206 is configurable by a user, and can provide output, for example, to display 108, in a variety of formats. Visible light camera module 206 may include compensation functionality for varying lighting or other operating conditions or user preferences. The visible light camera module may provide a digital output including image data, which may include data in a variety of formats (e.g., RGB, CYMK, YCbCr, etc.).

Visible light sensor 242 may include a plurality of visible light sensor elements such as, e.g., CMOS detectors, CCD detectors, PIN diodes, avalanche photo diodes, or the like. The number of visible light sensor elements may be the same as or different than the number of infrared light sensor elements.

In operation, optical energy received from a target scene may pass through visible light lens assembly 106 and be focused on visible light sensor 242. When the optical energy impinges upon the visible light sensor elements of visible light sensor 242, photons within the photodetectors may be released and converted into a detection current. Processor 222 can process this detection current to form a visible light image of the target scene.

During use of thermal imaging camera 100, processor 222 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 222 can generate a "frame" of visible light image data by measuring the response of each visible light sensor element of thermal imaging camera 100 a single time. By generating a frame of visible light data, processor 222 captures visible light image of a target scene at a given point in time. Processor 222 may also repeatedly measure the response of each visible light sensor element of thermal imaging camera 100 so as to generate a dynamic thermal image (e.g., a video representation) of a target scene, as described above with respect to infrared camera module 200. In some examples, the visible light camera module 206 may include its own dedicated processor or other circuitry (e.g., ASIC) capable of operating the visible light camera module 206. In some such embodiments, the dedicated processor is in communication with processor 222 for providing visible light image data (e.g., RGB image data) to processor 222. In alternative embodiments, a dedicated processor for the visible light camera module 206 may be integrated into processor 222.

With each sensor element of visible light camera module 206 functioning as a sensor pixel, processor 222 can generate a two-dimensional image or picture representation of the visible light from a target scene by translating an electrical response of each sensor element into a time-multiplexed electrical signal that can be processed, e.g., for visualization on display 108 and/or storage in memory.

Processor 222 may control display 108 to display at least a portion of a visible light image of a captured target scene. In some examples, processor 222 controls display 108 so that the electrical response of each sensor element of visible light camera module 206 is associated with a single pixel on display 108. In other examples, processor 222 may increase or decrease the resolution of a visible light image so that there are more or fewer pixels displayed on display 108 than there are sensor elements in visible light camera module 206. Processor 222 may control display 108 to display an entire visible light image (e.g., all portions of a target scene captured by thermal imaging camera 100) or less than an entire visible light image (e.g., a lesser port of the entire target scene captured by thermal imaging camera 100).

In some embodiments, one or both of infrared 200 and visible light 206 camera modules for acquiring IR and VL image data may be included in an image acquisition module 280. The image acquisition module may be in wired or wireless communication with a processing module 290 that includes a processor such as 222. Processing module 290 may receive image data from the image acquisition module 280 and perform subsequent processing steps as will be described herein. In some examples, processing module 290 may include portable processing devices, such as a smartphone, a tablet, a stand-alone computer such as a laptop or desktop PC, or the like. In some such embodiments, various components of front end circuitry 202 may be included in the image acquisition module 280, the processing module 290, or both.

In these and other examples, processor 222 may control display 108 to concurrently display at least a portion of the visible light image captured by thermal imaging camera 100 and at least a portion of the infrared image captured by thermal imaging camera 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a combined arrangement. In such an arrangement, for a pixel or set of pixels in the visible light image representative of a portion of the target scene, there exists a corresponding pixel or set of pixels in the infrared image, representative of substantially the same portion of the target scene. In various embodiments, the size and/or resolution of the IR and VL images need not be the same. Accordingly, there may exist a set of pixels in one of the IR or VL images that correspond to a single pixel in the other of the IR or VL image, or a set of pixels of a different size. Similarly, there may exist a pixel in one of the VL or IR images that corresponds to a set of pixels in the other image. Thus, as used herein, corresponding does not require a one-to-one pixel relationship, but may include mismatched sizes of pixels or groups of pixels. Various combination techniques of mismatched sized regions of images may be performed, such as up- or down-sampling one of the images, or combining a pixel with the average value of a corresponding set of pixels. Other examples are known and are within the scope of this disclosure.

Thus, corresponding pixels need not have a direct one-to-one relationship. Rather, in some embodiments, a single infrared pixel has a plurality of corresponding visible light pixels, or a visible light pixel has a plurality of corresponding infrared pixels. Additionally or alternatively, in some embodiments, not all visible light pixels have corresponding infrared pixels, or vice versa. Such embodiments may be indicative of, for example, a picture-in-picture type display as previously discussed. Thus, a visible light pixel will not necessarily have the same pixel coordinate within the visible light image as does a corresponding infrared pixel. Accordingly, as used herein, corresponding pixels generally refers pixels from any image (e.g., a visible light image, an infrared image, a combined image, a display image, etc.) comprising information from substantially the same portion of the target scene. Such pixels need not have a one-to-one relationship between images and need not have similar coordinate positions within their respective images.

Similarly, images having corresponding pixels (i.e., pixels representative of the same portion of the target scene) can be referred to as corresponding images. Thus, in some such arrangements, the corresponding visible light image and the infrared image may be superimposed on top of one another, at corresponding pixels. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque. Such an exemplary combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 222 may also combine scene information with other data, such as radiometric data, alarm data, and the like. In general, an alpha-blended combination of visible light and infrared images can comprise anywhere from 100 percent infrared and 0 percent visible light to 0 percent infrared and 100 percent visible light. In some embodiments, the amount of blending can be adjusted by a user of the camera. Thus, in some embodiments, a blended image can be adjusted between 100 percent visible light and 100 percent infrared.

Additionally, in some embodiments, the processor 222 can interpret and execute commands from user interface 208, and/or output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 222.

Processor can further include other components to assist with the processing and control of the infrared imaging camera 100. For example, as discussed above, in some embodiments, an ADC can be incorporated into the processor 222. In such a case, analog signals conditioned by the front-end stages 204 are not digitized until reaching the processor 222. Moreover, some embodiments can include additional on board memory for storage of processing command information and scene data, prior to transmission to the display 108 or the output/control device 210.

An operator may interact with thermal imaging camera 100 via user interface 208, which may include buttons, keys, or another mechanism for receiving input from a user. The operator may receive output from thermal imaging camera 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale. In other examples, display 108 is configured to display an infrared image in a color palette such as, e.g., amber, ironbow, blue-red, or other high contrast color scheme. Combinations of grayscale and color palette displays are also contemplated. In some examples, the display being configured to display such information may include processing capabilities for generating and presenting such image data. In other examples, being configured to display such information may include the ability to receive image data from other components, such as processor 222. For example, processor 222 may generate values (e.g., RGB values, grayscale values, or other display options) for each pixel to be displayed. Display 108 may receive such information and map each pixel into a visual display.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of thermal imaging camera 100 and, in some examples, may include a rechargeable or non-rechargeable battery and a power generation circuit.

During operation of thermal imaging camera 100, processor 222 controls infrared camera module 200 and visible light camera module 206 with the aid of instructions associated with program information that is stored in memory to generate a visible light image and an infrared image of a target scene. Processor 222 further controls display 108 to display the visible light image and/or the infrared image generated by thermal imaging camera 100.

Figure 4:
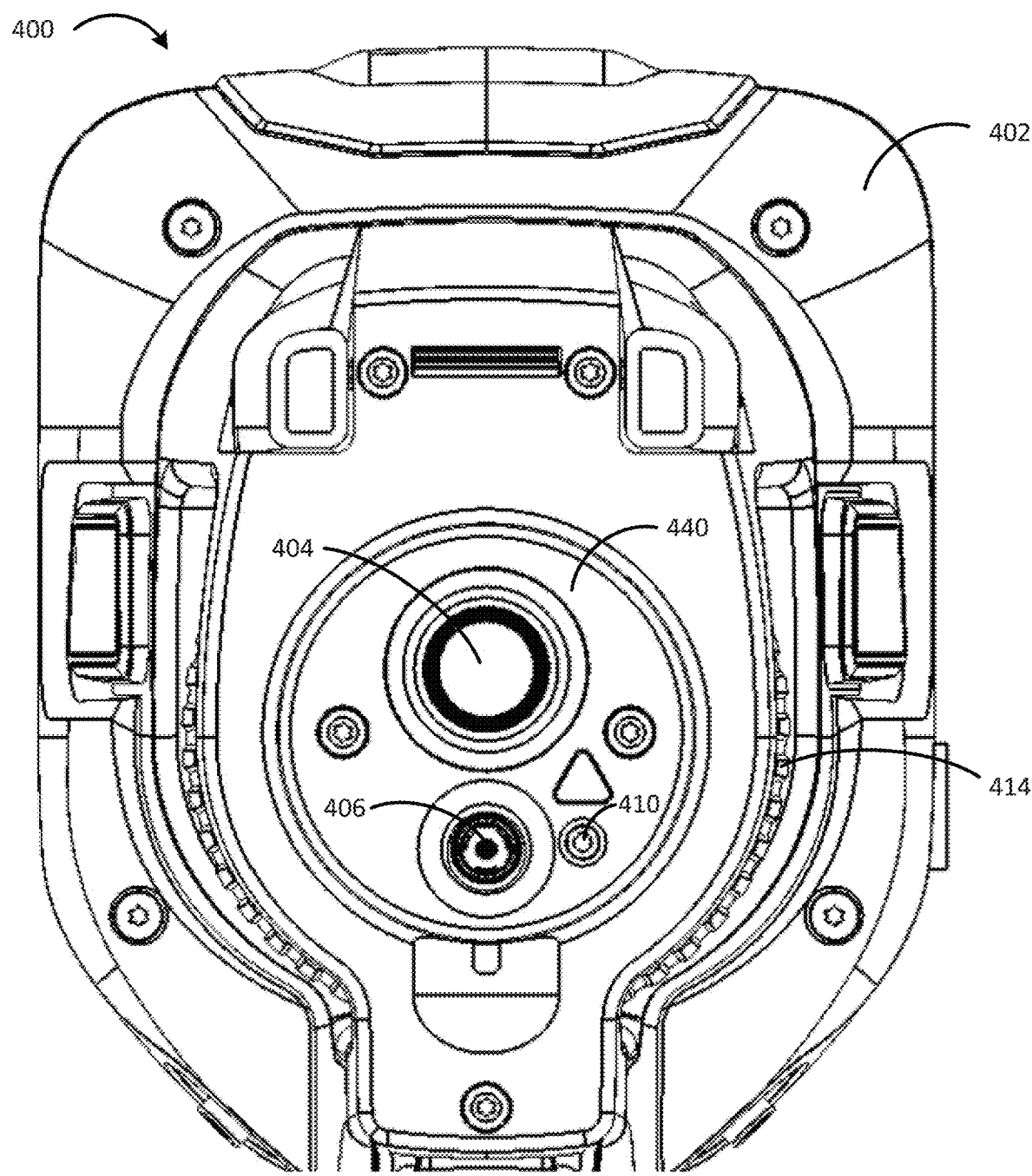
FIG. 4 is a front view of a thermal imaging camera such as that shown in FIG. 1.

FIG. 4 is a front view of a thermal imaging camera such as that shown in FIG. 1. As shown, the thermal imaging camera 400 includes a housing 402, and infrared lens assembly 404, a visible light lens assembly 406, a laser 410, and a focus ring 414. In the illustrated embodiment, each of the infrared lens assembly 404, the visible light lens assembly 406, and the laser 410 are located within the perimeter of the focus ring 414.

Such a configuration allows for the visible light lens assembly 406 and the infrared lens assembly 404 to be positioned closer together than if the visible light lens assembly 406 were positioned outside the perimeter of the focus ring 414 while the infrared lens assembly 404 is positioned within the perimeter. Similarly, the laser 410 can be positioned more closely to the infrared lens assembly 404 than if it were located outside of the perimeter of the focus ring. In addition, positioning both the laser 410 and the visible light lens assembly 406 inside the perimeter of the focus ring 414 can position such elements closer together than if just one of such elements were positioned inside the perimeter of the focus ring 414. This positioning can reduce parallax errors between the infrared lens assembly 404 and the visible light lens assembly 406, between the infrared lens assembly 404 and the laser 410, and/or between the visible light lens assembly 406 and the laser 410. In some exemplary embodiments, the separation between the optical axes of the visible light lens assembly 406 and the infrared lens assembly 404 is approximately 0.8 inches. In some embodiments, the closely placed infrared lens assembly 404 and visible light lens assembly 406 can significantly reduce parallax errors when compared to embodiments in which the visible light lens assembly 406 and the infrared lens assembly 404 are spaced further away.

In some embodiments, the infrared lens assembly 404 sized with respect to the diameter of the focus ring 414 so that other components may also fit within the perimeter of the focus ring 414. For instance, in an exemplary embodiment, the focus ring 414 is sized to ergonomically fit a typical user. That is, the outer diameter of the focus ring 414 can be selected for optimum comfort and maneuverability of a user. In some examples, the outer diameter of the focus ring 414 can additionally or alternatively be made relative to the size of other components (e.g., display 108) of the camera. For instance, in an exemplary embodiment, the display (e.g., 108) is approximately 3.5 inches diagonal, and the focus ring 414 is about 2.7 inches in diameter so that the user is comfortable operating the focus ring 414 relative to the overall camera size.

In the illustrated embodiment, the optical axis of the infrared lens assembly 404 is offset from the centerline of the focus ring 414. In combination with the relative size of the infrared lens assembly 404 compared to the perimeter of the focus ring 414, positioning the infrared lens assembly 404 offset from the center of the focus ring 414 frees up more usable space within the perimeter of the ring 414, allowing the visible light lens assembly 406, as well as the laser, to be positioned therein. While not shown in the illustrated embodiment, some thermal imaging cameras can include a torch configured to illuminate the target scene by emitting light toward the scene. In some such examples, the torch may similarly be positioned within the perimeter of the focus ring 414. This can prevent components of the camera from casting shadows on the target scene by partially blocking light emitted from the torch.

Figure 5:
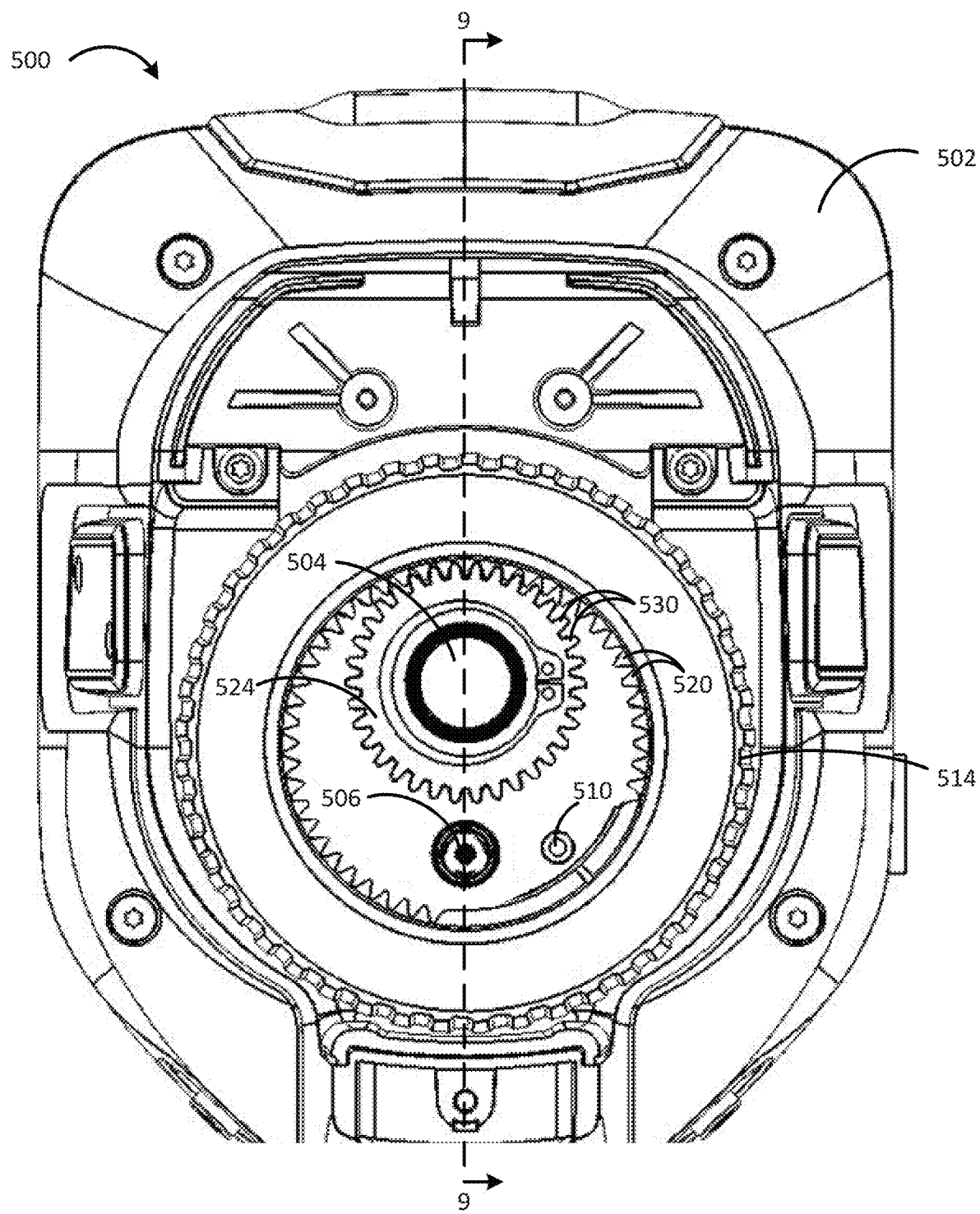
FIG. 5 is a front view of a thermal imaging camera such as that of FIG. 4 with the faceplate removed.

The thermal imaging camera 400 of FIG. 4 includes a faceplate 440 disposed in the perimeter of the focus ring 414 to protect interior components of the camera 400. FIG. 5 is a front view of a thermal imaging camera such as that of FIG. 4 with the faceplate removed. In the illustrated embodiment, the infrared lens assembly 504 is surrounded by an inner gear 524. The inner gear 524 can be configured to engage the infrared lens assembly 504 so that rotation of the inner gear 524 causes similar rotation of the infrared lens assembly. 504. As shown, the focus ring 514 of the thermal imaging camera 500 functions as a ring gear having teeth 520 that engage teeth 530 of the inner gear 524. In such a configuration, when the focus ring 514 is rotated, the teeth 520 of the ring gear engage the teeth 530 of the inner gear 524, causing the inner gear to similarly rotate. However, it will be noted that, while the ring gear of the focus ring 514 and the inner gear 524 are configured to rotate together, they do not rotate about the same axis. Rather, the axis of rotation of the inner gear 524 is offset from the axis of rotation of the focus ring 514. In the illustrated example, the axis of rotation of the inner gear 524 is approximately the same as the optical axis of the infrared lens assembly 504. If the inner gear 524 is engaged with the infrared lens assembly 504, rotation of the inner gear 524 likewise causes rotation of the infrared lens assembly 504 about its optical axis. While shown in the illustrated embodiment as engaging one another by meshing teeth 520, 530, it will be appreciated that the engaging relationship between the focus ring 514 and the inner gear 524 can include a number of possibilities. For instance, in some embodiments, one or both of the inner surface of the focus ring 514 and the outer surface of the inner gear 524 can include a high-friction surface such that the friction between the two components causes rotation of the inner gear 524 when the focus ring 514 is rotated.

In some examples, focus ring 514 (and thus, in some examples, the inner gear 524 and infrared lens assembly 504) rotates relative to the housing 502 of the thermal imaging camera. In some embodiments, the focus ring 514 rotates relative to the housing 502 while components located inside the perimeter of the focus ring 514 such as the visible light lens assembly 506 and the laser 510 remain stationary relative to the housing 502. That is, in some embodiments, rotation of the focus ring 514 causes rotation of the inner gear 524 and the infrared lens assembly 504, but the visible light lens assembly 506 and the laser 510 remain stationary.

Figure 6:
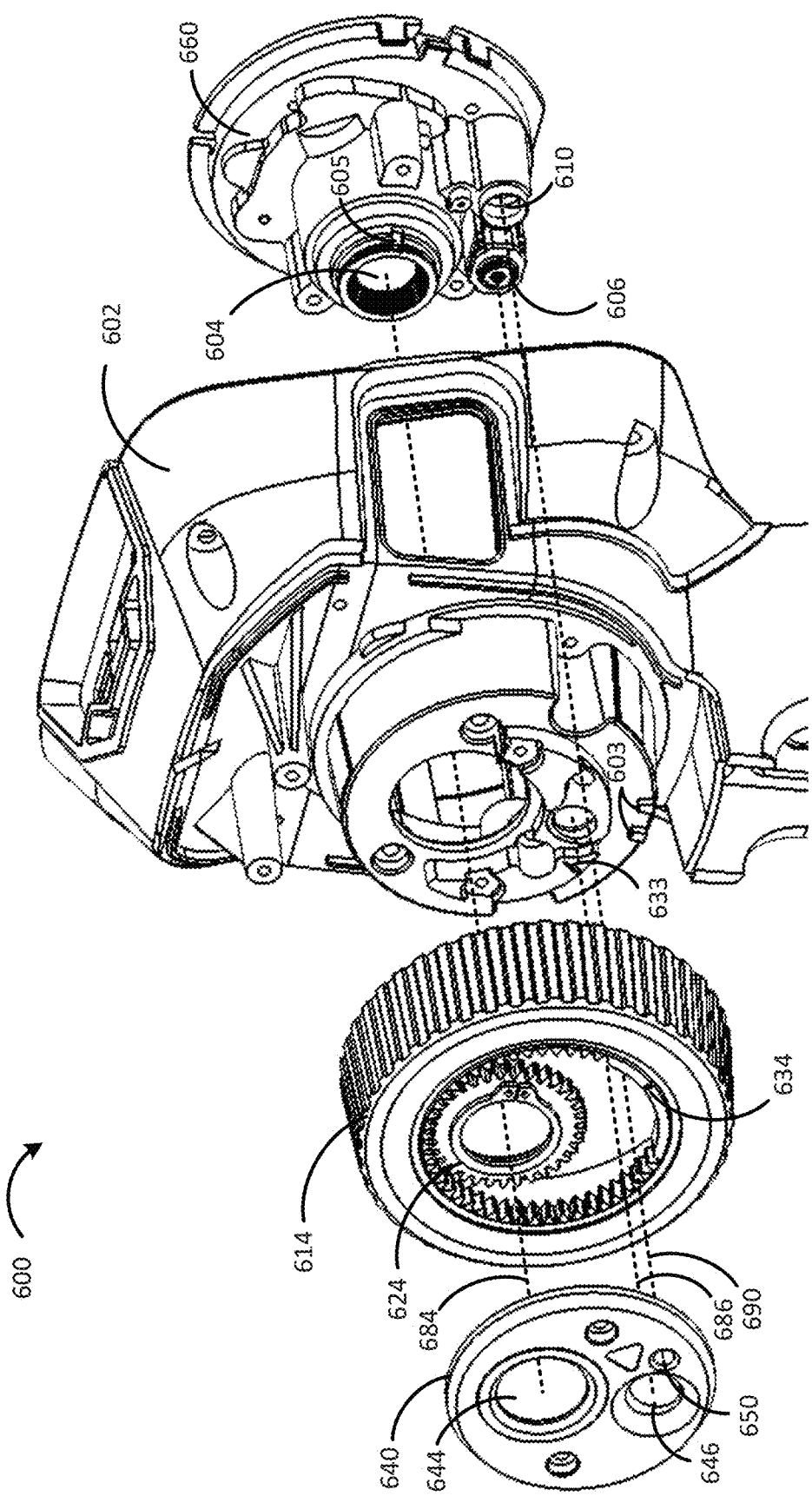
FIG. 6 is an exploded view of portions of an exemplary thermal imaging camera according to some embodiments.

FIG. 6 is an exploded view of portions of an exemplary thermal imaging camera according to some embodiments. In the illustrated embodiment, the infrared lens assembly 604, the visible light lens assembly 606, and the laser 610 are each supported by a structure referred to as the sensor can 660. In some examples, the sensor can 660 can be formed from a single piece of material, such as a machined metal or a molded metal or plastic. While shown as being supported by the sensor can 660, the infrared lens assembly 604, the visible light lens assembly 606, and/or the laser 610 need not be fixedly attached to the sensor can 660. For example, in some embodiments, the infrared lens assembly 604 is capable of axial rotation within the sensor can 660.

The thermal imaging camera 600 includes a focus ring 614 interfacing with an inner gear 624. As described elsewhere herein, rotation of the focus ring 614 can cause rotation of the inner gear 624, for example, by way of meshing teeth at the interface between the components. In the illustrated embodiment, the sensor can 660 is aligned so that infrared lens assembly 604 is aligned with the inner gear 624 within the perimeter of the focus ring 614 as well as an infrared lens aperture 644 in the faceplate 640. As shown, such components are aligned along infrared optical axis 684. Accordingly, when assembled, a portion of the infrared lens assembly 604 protrudes through the housing 602 and interfaces with the inner gear 624. The faceplate 640 can be attached so that it blocks minimal or no infrared radiation from impinging on the infrared lens assembly 604.

The faceplate 640 can include visible light aperture 646 and laser aperture 650 for permitting light to be detected or emitted by the visible light lens assembly 606 and the laser 610 along axes 686 and 690, respectively. As shown, visible light optical axis 686 and laser axis 690 each extend through a gap within the perimeter of the focus ring 614. Thus, rotation of the focus ring 614 and the inner gear 624 happens independently from and does not interfere with the visible light lens assembly 606 and the laser 610.

Various portions of the thermal imaging camera can include interfacing components configured to facilitate engagement between components and/or limit the motion of components. For instance, in some embodiments, the housing 602 includes stops 603 which may limit the rotation of the focus ring 614 about the housing 602, which may in turn limit the rotation of the inner gear 624 and the infrared lens assembly 604. Additionally or alternatively, the infrared lens assembly 604 can include an engagement portion such as groove 605 for engaging a portion of the inner gear 624.

During exemplary operation of the illustrated embodiment, when assembled, the focus ring 614 is rotatable relative to the housing 602, sensor can 660, and the faceplate 640, each of which remain may remain stationary while the focus ring 614 rotates. The focus ring 614 includes a ring gear which engages an inner gear 624, which engages the infrared lens assembly 604 via the groove 605 therein. Rotation of the focus ring 614 causes rotation of the inner gear 624, which causes rotation of the infrared lens assembly 604 within the sensor can 660. In some examples, the amount of rotation of the focus ring 614 is limited by stops 603 on the housing 602.

In some examples, thermal imaging camera 600 can be assembled via a method illustrated by FIG. 6. In an exemplary assembly method, an infrared lens assembly 604 can be threadably engaged with a sensor can 660. The infrared lens assembly 604 and sensor can 660 can be inserted into a back side of a housing 602. An inner gear 624 can engage the infrared lens assembly 604 from a front side of the housing 602, the front side being opposite the back side of the housing. The inner gear 624 can be attached to the infrared lens assembly 604 such that rotation of the inner gear 624 causes rotation of the infrared lens assembly 604, for example, by way of the groove 605 on the infrared lens assembly 604 and a corresponding tab on the inner gear. Additionally or alternatively, assembly methods can include the steps of positioning a visible light lens assembly 606, a laser 610, a torch (not shown), and/or other component within the sensor can.

According to some exemplary assembly methods, the focus ring 614 can be added to the front side of the housing 602 so that an inner surface of the focus ring 614 engages an outer surface of the inner gear 624. In some such examples, rotation of the focus ring 614 causes rotation of the inner gear 624. Thus, in some embodiments, components are assembled such that rotating the focus ring 614 causes rotation of the inner gear 624, which causes rotation of the infrared lens assembly 604 within the sensor can 660.

Figure 7:
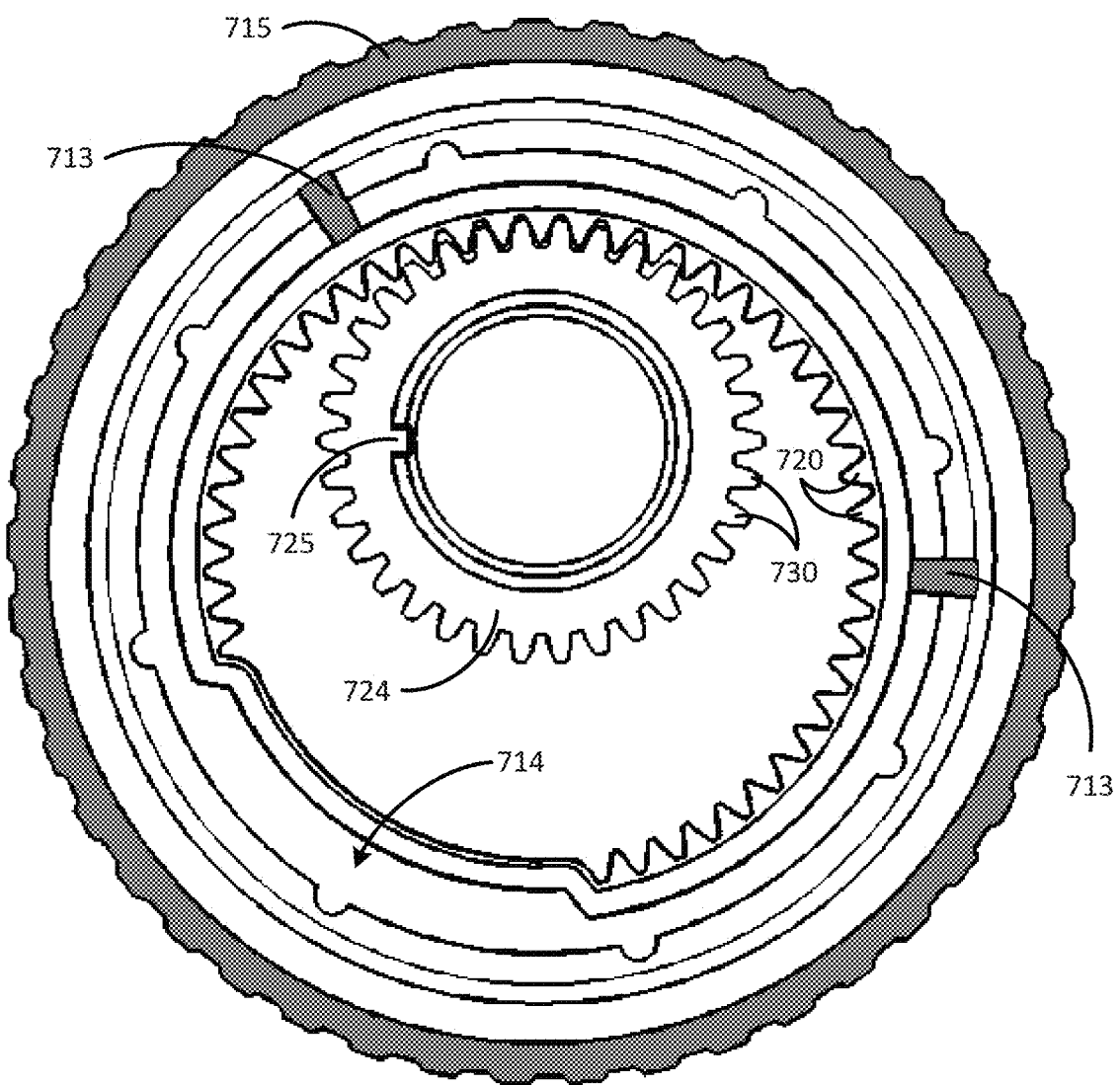
FIG. 7 is a back view of an exemplary focus ring and inner gear.

FIG. 7 is a back view of an exemplary focus ring and inner gear. In the illustrated example, the focus ring 714 includes an inner surface having a plurality of teeth 720 configured to engage and mesh with teeth 730 on an outer surface of the inner gear 724. As described elsewhere herein, the engagement between teeth 730 of the inner gear 724 and the teeth 720 of the focus ring 714 can result in the inner gear 724 rotating whenever the focus ring 714 is rotated.

In the exemplary embodiment of FIG. 7, the focus ring 714 includes a grip surface 715 (shaded) to facilitate the grasping and rotating by a user. The grip surface 715 can provide a comfortable surface for the user to grip as well as sufficient friction (e.g., via one or both of texture and material) to eliminate excessive slipping of a user's hand on the focus ring 714. The exemplary focus ring 714 of FIG. 7 further includes stops 713 (shaded) disposed on the back surface thereof. Stops 713 can be configured to engage with a portion of the thermal imaging camera (e.g., stops 603 on the housing 602 in FIG. 6) in order to limit the rotation of the focus ring 714. In a particular example, stops 713 of the focus ring 714 and corresponding stops (e.g., 603) on the thermal imaging camera can limit rotation of the focus ring 714 to a range of approximately 210°.

In some examples the camera can be assembled in a pre-selected initial focus position. For example, with reference to FIG. 6, in some embodiments, the housing 602 and the focus ring 614 include assembly alignment marks (633, 634, respectively) such that aligning the marks 633, 634 during assembly results in the pre-selected initial focus position. In some exemplary assembly methods, the infrared lens assembly (e.g., 604) can be threaded to a known focus position in the sensor can (e.g., 660) so that the infrared lens assembly can be rotated in either direction about its optical axis (e.g., 684) within the sensor can and remain threadably engaged therewith. Similarly, the focus ring can be positioned on the front side of the housing using assembly alignment marks 633, 634 such that the focus ring can be rotated in either direction about its central axis without being immediately limited by stops (e.g., 603, 713). For instance, in an exemplary configuration, the focus ring can be positioned on the housing such that the focus ring can be rotated substantially the same amount in either direction before one of stops 713 encounters one of stops 603 and prevents further rotation the focus ring. In other examples, the position of the focus ring 614, when aligned with the housing 602 via the assembly alignment marks 633, 634, is not centered between stops 603, but rather is offset one direction or another. For instance, in an alternative embodiment, the infrared lens assembly can be threaded to an extreme (i.e., a maximum or minimum) focal position and the focus ring can be installed so that a stop 713 is immediately adjacent to a corresponding stop 603 to prevent additional rotation past the extreme focal position. Such assembly processes can place the camera in a focus position wherein rotating the focus ring 614 as permitted by the stops 603, 713 safely rotates the infrared lens assembly 604 within the sensor can 660 without risk of the infrared lens assembly 604 rotating too far within the sensor can 660. Otherwise, excess rotation of the infrared lens assembly can cause the infrared lens assembly to unscrew from and disengage the sensor can and/or cause the threads to bind and become damaged.

In the embodiment of FIG. 7, the inner gear 724 includes a tab 725 that can interface with a corresponding portion of the infrared lens assembly. For example, tab 725 can interface with a groove (e.g., 605 of FIG. 6) of the infrared lens assembly (e.g., 604 of FIG. 6). Such engagement can couple the inner gear 724 and the infrared lens assembly such that rotation of the inner gear 724 causes rotation of the infrared lens assembly.

Figure 8:
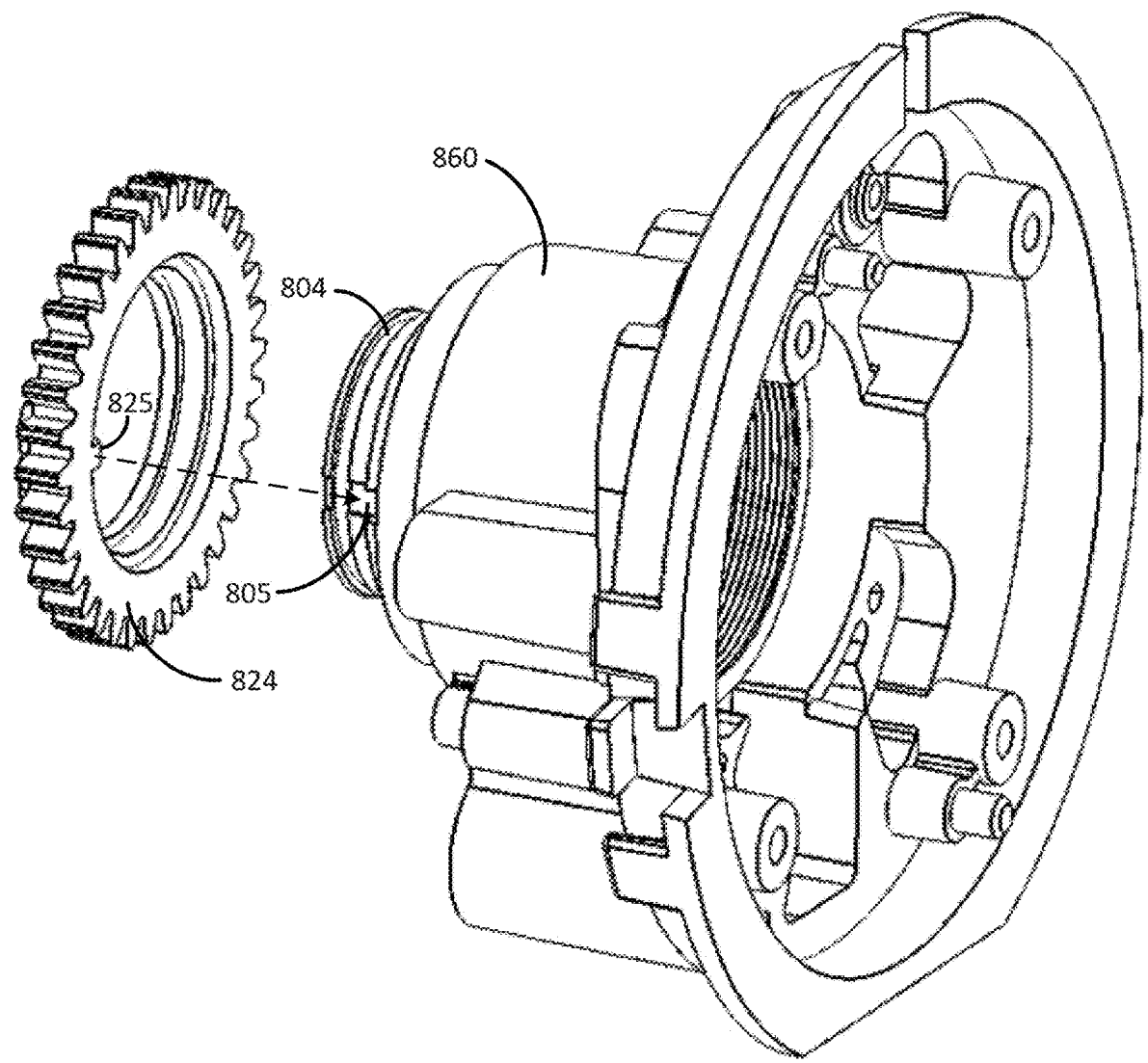
FIG. 8 is an exploded view showing an exemplary configuration between an inner gear and an infrared lens assembly.

FIG. 8 is an exploded view showing an exemplary configuration between an inner gear and an infrared lens assembly. In the illustrated example, an inner gear 824 includes an aperture and a tab 825 projecting inward toward the aperture. In the illustrated example, the infrared lens assembly 804 is supported by a sensor can 860 and includes a groove 805 formed in an outer edge thereof. As shown by the broken-line arrow, the tab 825 in the inner gear 824 aligns with groove 805 in the infrared lens assembly 804 such that the groove 805 may receive the tab 825.

In the illustrated embodiment, the aperture in the inner gear 824 is configured such that a portion of the infrared lens assembly 804 protrudes into the aperture of the inner gear 824 when the groove 805 receives the tab 825. Because the tab 825 of the inner gear is received by the groove 805 of the infrared lens assembly 804, rotation of the inner gear 824 about the optical axis of the infrared lens assembly 804 causes rotation of the infrared lens assembly 804 about its optical axis. As described elsewhere herein, in some embodiments, the infrared lens assembly 804 is rotatable within the sensor can 860. Accordingly, rotation of the inner gear 824 can cause rotation of the infrared lens assembly 804 within the sensor can 860 while the sensor can 860 remains stationary. In some embodiments, the inner gear 824 may be integrally formed with a portion of the infrared lens assembly such that both the inner gear 824 and the infrared lens assembly rotate together as one piece.

Figure 9:
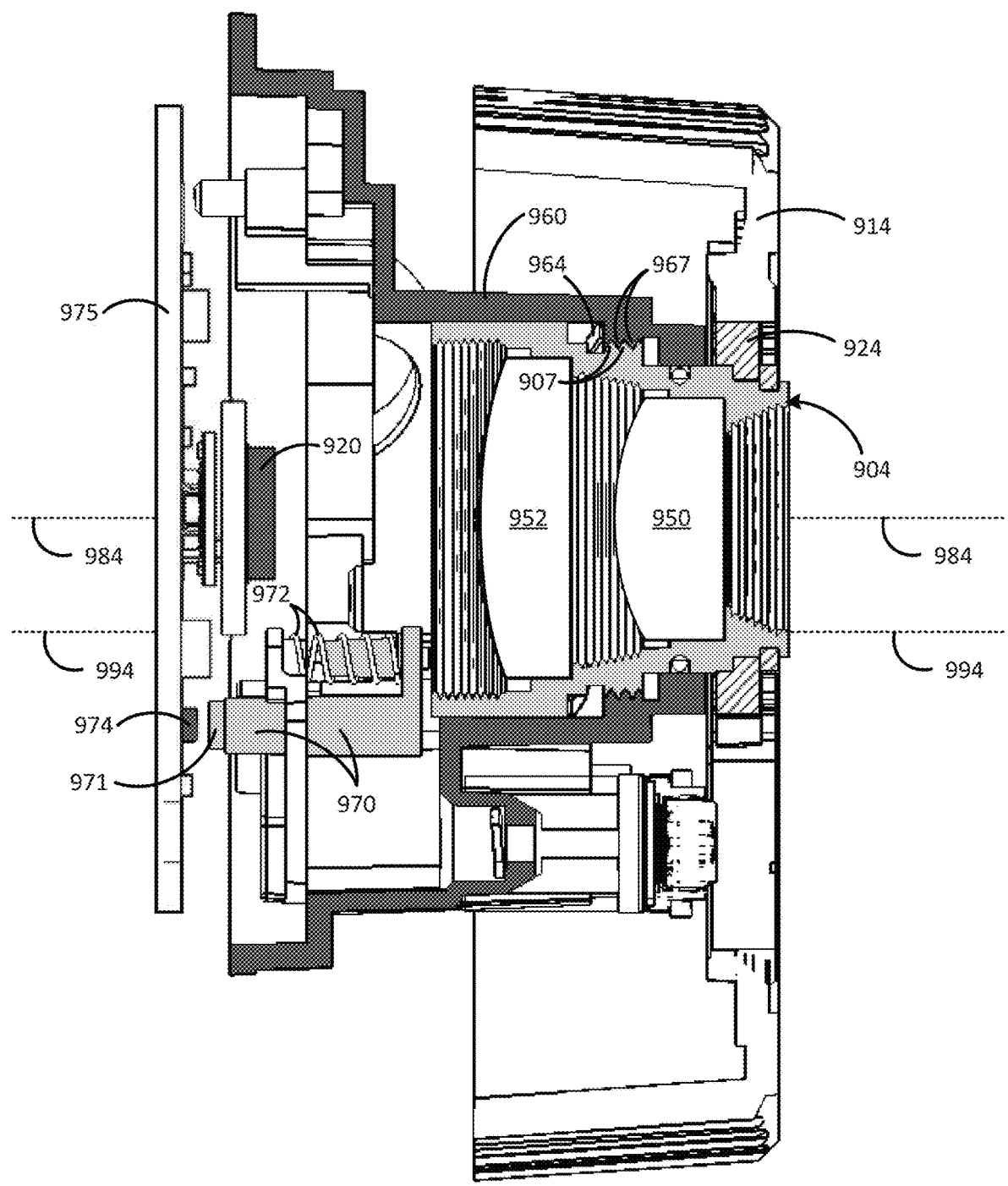
FIG. 9 is a cross-sectional view of portions of an exemplary thermal imaging camera taken along line 9-9 in FIG. 5.

FIG. 9 is a cross-sectional view of portions of an exemplary thermal imaging camera taken along line 9-9 in FIG. 5. In the illustrated example, the thermal imaging camera includes an infrared lens assembly 904. The infrared lens assembly 904 of FIG. 9 includes a frame (shaded in light gray) supporting two lenses 950 and 952. It will be appreciated that a single lens or other number of lenses can be included in the infrared lens assembly 904.

The thermal imaging camera of FIG. 9 includes a focus ring 914 that engages an inner gear 924, for example, via intermeshing teeth such as shown in the examples of FIGS. 5-7. In some embodiments, inner gear 924 comprises an interfacing portion for engaging a portion of infrared lens assembly 904 to secure the infrared lens assembly 904 to the inner gear 924. For example, in some embodiments, the interfacing portion comprises a tab (e.g., 825 in FIG. 8) for engaging a groove (e.g., 805 in FIG. 8) in the infrared lens assembly 904 (e.g., in the frame). As described elsewhere herein, in some examples, engagement between the focus ring 914 and the inner gear 924 in combination with engagement between the inner gear 924 and the infrared lens assembly 904 can operate so that, when the focus ring 914 is rotated about its center axis (994), the infrared lens assembly 904 also rotates about its center axis (984). In the embodiment of FIG. 9, the axis of rotation (994) of the focus ring 914 is offset from the axis of rotation (984) of the infrared lens assembly 904. In some examples, the inner gear 924 rotates about the same axis as the infrared lens assembly (e.g., 984).

As shown, the infrared lens assembly 904 is generally supported by sensor can 960 (shaded dark gray). As described elsewhere herein, sensor can 960 can support additional components, such as a visible light lens assembly, a laser, or other components of the thermal imaging camera. In some examples, the sensor can 960 is fixed relative to an infrared sensor 920 of the camera. In the illustrated embodiment, the infrared lens assembly 904 includes threads 907 interfacing with threads 967 of the sensor can 960. Accordingly, in some such embodiments, rotation of the infrared lens assembly 904 with respect to the sensor can 960 can cause the infrared lens assembly 904 to also translate with respect to the sensor can 960.

During a focusing operation of an exemplary embodiment of a thermal imaging camera, a user may grasp and rotate the focus ring 914. The rotation of the focus ring 914 causes rotation of the inner gear 924, for example, via intermeshing teeth of an inner surface of the focus ring 914 and an outer surface of the inner gear 924. Rotation of the inner gear 924 in turn causes rotation of the infrared lens assembly 904, which rotates about its center axis 984 and relative to the sensor can 960. The threaded engagement between the infrared lens assembly 904 and the sensor can 960 causes the infrared lens assembly 904 to translate with respect to the sensor can 960 along its axis of rotation 984 upon rotation. If the sensor can 960 is fixed relative to the IR sensor 920, translation of the infrared lens assembly 904 relative to the sensor can 960 similarly results in translation of the infrared lens assembly 904 relative to the IR sensor 920, which in some embodiments, is located substantially along the axis of rotation 984 of the infrared lens assembly 904. Thus, the infrared lens assembly 904 translates toward or away from the infrared sensor, thereby adjusting the infrared imaging focal distance.

As described elsewhere herein, in some examples, portions of the thermal imaging camera can include stops (e.g., 603 on the housing 602 in FIG. 6; 713 on the focus ring 714 in FIG. 7) that can limit the rotation of the focus ring 714. In some embodiments, stops may be positioned so as to limit the rotation or translation of additional or alternative components. Accordingly, in some embodiments, limits are placed on the motion of one or more components, which may ultimately limit the travel distance of the infrared lens assembly 904 within the sensor can 960. This may prevent the infrared lens assembly 904 from "unscrewing" from the sensor can 960 and/or excessive travel of the infrared lens assembly 904, which may otherwise collide with other components within the thermal imaging camera. In some embodiments, maximum travel distance by the infrared lens assembly 904 is approximately 0.02 inches.

In some embodiments, a small travel distance between focal extremes of the infrared lens assembly 904 requires precise movement and alignment of the infrared lens assembly 904 relative to other components, such as an infrared sensor 920. In some embodiments, the thermal imaging camera includes components for stabilizing the infrared lens assembly in place within the camera. For instance, in the illustrated embodiment of FIG. 9, the camera includes a wave spring 964 positioned between a portion of the infrared lens assembly 904 and the sensor can 960 to press the infrared lens assembly 904 against the sensor can 960. This can serve to reduce misalignment such as tilting or wobbling of the infrared lens assembly 904, for example, in the threads 907. Other springs or components capable of increasing the force between the infrared lens assembly 904 and the sensor can 960 can be used alternatively or in addition to wave spring 964. Different spring configurations can provide different numbers of points of pressure exerted on the infrared lens assembly 904 and the sensor can 960. In some embodiments, wave spring 964 can contact each of the infrared lens assembly 904 and the sensor can 960 in three or more points around a circumference. Three or more individual spring components can similarly provide three or more points of contact between the infrared lens assembly 904 and the sensor can 960. In some embodiments, an elastic material may provide continuous contact to the infrared lens assembly 904 and the sensor can 960 about an entire circumference.

In some embodiments, the camera is capable of determining the current focal position of the infrared lens assembly 904. In the illustrated embodiment, the camera includes a plunger 970 operably engaging the infrared lens assembly 904. In some examples, plunger 970 can be pressed against the infrared lens assembly 904 via a spring 972. Additionally or alternatively, spring 972 can provide added resistance to movement of the infrared lens assembly 904 toward the camera body. During exemplary operation, if the infrared lens assembly 904 is moved proximally toward the camera body (to the left in the example of FIG. 9), the spring 972 is compressed and the plunger 970 moves proximally.

The camera can include a sensor 974 configured to measure the proximity of the plunger 970. In some examples, the sensor 974 is fixed relative to the sensor can 960 so that motion of the infrared lens assembly 904 within the sensor can 960 causes the plunger 970 to similarly move relative to the sensor 974. Thus, in some embodiments, the sensor 974 can output a signal indicative of the distance between the plunger 970 and the sensor 974, which can be received by a processor (e.g., 222 from FIG. 3). The distance between the plunger 970 and the sensor 974 can be converted into a relative position of the infrared lens assembly 904 relative to an infrared imaging element 920, and thus a relative or absolute focal distance of the camera. For example, in some embodiments, the infrared sensor 920 and sensor 974 can be fixed to a sensor board 975 that is maintained stationary relative to the sensor can 960. Rotating the focus ring 914 can cause movement of the infrared lens assembly 904 and the plunger 970 relative to the sensor board 975.

In some exemplary embodiments, the plunger 970 can include a magnet detectable by a sensor 974 such as a magnetic encoder. In various such examples, the plunger 970 can comprise a magnetic material or can support a magnet, for example, mounted on or in its proximal end 971. The sensor 974 can include an encoder capable of measuring the field strength of the magnetic field present at the sensor 974 from the magnet of the plunger 970. Other proximity detecting technologies are possible for use in determining a distance traveled by and/or an absolute position of the plunger 970 in order to establish an absolute or relative focal position of the infrared lens assembly 904.

Various embodiments have been described. Such examples are non-limiting, and do not define or limit the scope of the invention in any way. Rather, these and other examples are within the scope of the following claims.

The invention claimed is:

1. An adjustable-focus thermal imaging camera comprising:
    an infrared sensor configured to receive infrared radiation from a target scene and generate infrared image data of the target scene;
    an infrared lens assembly comprising at least one lens defining an infrared optical axis, the infrared lens assembly being configured to focus infrared radiation onto the infrared sensor;
    a visible light sensor configured to receive visible light radiation from a target scene and generate visible light image data representative of the target scene;
    a visible light lens assembly configured to focus visible light radiation onto the visible light sensor and defining a visible light optical axis, the visible light optical axis being offset from the infrared optical axis such that the visible light optical axis and infrared optical axis are not coaxial; and a rotatable focus ring for adjusting a focus of the adjustable-focus thermal imaging camera, the rotatable focus ring having a central axis and a perimeter defining an opening; wherein
the infrared optical axis extends through the opening defined by the perimeter of the rotatable focus ring; and
the visible light optical axis extends through the opening defined by the perimeter of the rotatable focus ring.

2. The thermal imaging camera of claim 1, further comprising
a sensor can, the sensor can configured to support the visible light lens assembly and the infrared lens assembly.

3. The thermal imaging camera of claim 2, further comprising an inner gear configured to engage a portion of the infrared lens assembly and a portion of the focus ring such that the inner gear is configured to cause the infrared lens assembly to rotate within the sensor can when the focus ring is rotated; and wherein
the infrared lens assembly is configured to threadably engage with the sensor can and is configured such that the infrared lens assembly is configured to translate relative to the sensor can when the inner gear rotates within the sensor can.

4. The thermal imaging camera of claim 2, further comprising a spring disposed between a surface of the infrared lens assembly and the sensor can and configured to contact the infrared lens assembly and the sensor can in at least three locations to press the infrared lens assembly against a portion of the sensor can in substantially the same direction as the infrared optical axis defined.

5. The thermal imaging camera of claim 1, wherein:
the visible light lens assembly comprises at least one lens, and the visible light optical axis passes through a center of curvature of the at least one lens of the visible light lens assembly; and
the infrared optical axis passes through a center of curvature of the at least one lens of the infrared lens assembly.

6. The thermal imaging camera of claim 1, further comprising a motor that can be actuated to adjust a focus of the thermal imaging camera and a sensor configured to determine the focal position of the infrared lens assembly relative to the infrared sensor.

7. The thermal imaging camera of claim 1, further comprising a faceplate disposed within the perimeter of the focus ring and covering the opening defined by the perimeter of the rotatable focus ring, the faceplate comprising an infrared lens aperture aligned with the infrared optical axis and a visible light aperture aligned with the visible light optical axis.

8. An adjustable-focus thermal imaging camera comprising:
an infrared sensor configured to receive infrared radiation from a target scene and generate infrared image data of the target scene;
an infrared lens assembly comprising at least one lens and being configured to focus infrared radiation onto the infrared sensor, the infrared lens assembly defining an infrared optical axis;
a visible light sensor configured to receive visible light radiation from a target scene and generate visible light image data representative of the target scene;
a visible light lens assembly configured to focus visible light radiation onto the visible light sensor, the visible light lens assembly defining a visible light optical axis; and a rotatable focus ring having a central axis and a perimeter; wherein
the thermal imaging camera is configured such that rotation of the rotatable focus ring causes the at least one lens of the infrared lens assembly to move relative to the infrared sensor;
the visible light optical axis is offset from the infrared optical axis such that the visible light optical axis and infrared optical axis are not coaxial; and
the infrared lens assembly and the visible light lens assembly are located within the perimeter of the rotatable focus ring such that the visible light optical axis and the infrared optical axis extend through an opening defined by the perimeter of the rotatable focus ring.

9. The thermal imaging camera of claim 8, wherein the perimeter of the rotatable focus ring is defined by an inner surface of the rotatable focus ring.

10. The thermal imaging camera of claim 9, wherein infrared lens assembly and the visible light lens assembly are entirely within the perimeter defined by the inner surface of the rotatable focus ring.

11. The thermal imaging camera of claim 8, further comprising a torch configured to illuminate the target scene, and wherein the torch is positioned within the perimeter of the rotatable focus ring.

12. The thermal imaging camera of claim 8, further comprising a faceplate positioned within the perimeter of the rotatable focus ring, the faceplate comprising an infrared lens aperture aligned with the infrared optical axis and a visible light aperture aligned with the visible light optical axis.

13. The thermal imaging camera of claim 12, wherein the faceplate remains stationary relative to the thermal imaging camera when the rotatable focus ring is rotated.

14. An adjustable-focus thermal imaging camera comprising:
an infrared sensor configured to receive infrared radiation from a target scene and generate infrared image data of the target scene;
an infrared lens assembly comprising at least one lens defining an infrared optical axis and being configured to focus infrared radiation onto the infrared sensor;
a visible light sensor configured to receive visible light radiation from a target scene and generate visible light image data representative of the target scene;
a visible light lens assembly configured to focus visible light radiation onto the visible light sensor and defining a visible light optical axis, the visible light optical axis being offset from the infrared optical axis such that the visible light optical axis and infrared optical axis are not coaxial;
a rotatable focus ring for adjusting a focus of the adjustable-focus thermal imaging camera, the rotatable focus ring having a central axis and having an inner surface defining an opening; and
a faceplate covering the opening defined by the inner surface of the rotatable focus ring, the faceplate including an infrared lens aperture aligned with the infrared optical axis and a visible light aperture aligned with the visible light optical axis; wherein
the infrared optical axis and visible light optical axis extend through the opening defined by the inner surface of the rotatable focus ring.

15. The thermal imaging camera of claim 14, wherein the faceplate remains stationary relative to the thermal imaging camera when the rotatable focus ring is rotated.

16. The thermal imaging camera of claim 14, wherein:
the visible light lens assembly comprises at least one lens, and the visible light optical axis passes through a center of curvature of the at least one lens of the visible light lens assembly; and
the infrared optical axis passes through a center of curvature of the at least one lens of the infrared lens assembly.

17. The thermal imaging camera of claim 14, further comprising a torch configured to illuminate the target scene, and wherein the torch is positioned within the perimeter of the rotatable focus ring.

18. The thermal imaging camera of claim 14, further comprising a motor that can be actuated to adjust a focus of the thermal imaging camera and a sensor configured to determine the focal position of the infrared lens assembly relative to the infrared sensor.

19. The thermal imaging camera of claim 14, wherein
the visible light lens assembly comprises at least one lens, and the visible light optical axis passes through a center of curvature of the at least one lens of the visible light lens assembly; and
the infrared optical axis passes through a center of curvature of the at least one lens of the infrared lens assembly.

20. The thermal imaging camera of claim 14, wherein the central axis of the rotatable focus ring is offset from the visible light optical axis and the infrared optical axis such that none of the visible light optical axis, the infrared optical axis, and the central axis of the rotatable focus ring are coaxial.

* * * * *